United States Patent [19]

Nissato

[11] Patent Number: 5,684,989
[45] Date of Patent: Nov. 4, 1997

[54] TERMINAL DATABASE MANAGING SYSTEM AS LATEST VERSION

[75] Inventor: Hiroyuki Nissato, Kawasaki, Japan

[73] Assignee: Fujitsu Limited, Kawasaki, Japan

[21] Appl. No.: 485,119

[22] Filed: Jun. 7, 1995

Related U.S. Application Data

[63] Continuation of Ser. No. 888,754, May 27, 1992, abandoned.

[30] Foreign Application Priority Data

May 27, 1991 [JP] Japan .................. 3-121058

[51] Int. Cl.$^6$ .................. G06F 17/00; G06F 13/00
[52] U.S. Cl. .................. 395/617; 395/610; 395/615; 395/608; 395/616; 395/839; 395/200.08; 395/200.03; 395/853
[58] Field of Search .................. 395/600, 610, 395/615, 608, 616, 617, 200.08, 200.03, 839, 853; 364/DIG. 1

[56] References Cited

U.S. PATENT DOCUMENTS

| | | | |
|---|---|---|---|
| 3,670,310 | 6/1972 | Bharwani et al. | 340/172.5 |
| 4,635,189 | 1/1987 | Kendall et al. | 395/610 |
| 4,751,635 | 6/1988 | Kret | 364/200 |
| 4,833,597 | 5/1989 | Wakayama et al. | 364/200 |
| 5,012,405 | 4/1991 | Nishikado et al. | 364/200 |
| 5,081,608 | 1/1992 | Tamura et al. | 395/600 |
| 5,086,402 | 2/1992 | Sterling II | 364/514 |
| 5,241,639 | 8/1993 | Feldbrugge | 395/425 |
| 5,257,365 | 10/1993 | Powers et al. | 395/600 |
| 5,261,094 | 11/1993 | Everson et al. | 395/610 |
| 5,375,207 | 12/1994 | Blakely et al. | 395/200 |
| 5,495,610 | 2/1996 | Shing et al. | 395/600 |
| 5,539,905 | 7/1996 | Nissato | 395/608 |

*Primary Examiner*—Thomas G. Black
*Assistant Examiner*—Jean Raymond Homere
*Attorney, Agent, or Firm*—Staas & Halsey

[57] ABSTRACT

The present invention relates to a latest managing system of terminal database DB. The present invention curtails the waiting time for using a map at a terminal by deleting undefined map data from the map data of the terminal data base DB and transmitting defined map number and version number of the host at a predetermined time or according to an instruction from the host to update map data of the terminal data base to the latest map data provided by the host. A plurality of terminals are connected with a host through transmission lines. Map data of the map number other than those defined in the distribution defining file is deleted from the map data of the terminal data base either at the predetermined time or according to an instruction from the host. The current terminal version number of a map having the defined map number is transmitted from a terminal to the host through a transmission line and when the terminal version number is older than the host version number, the latest map data and host version number are transferred to the terminal to update the terminal map DB of the terminal to the latest version number.

4 Claims, 2 Drawing Sheets

5,684,989

TERMINAL DATABASE MANAGING SYSTEM AS LATEST VERSION

This application is a continuation of application Ser. No. 07/888,754, filed May 27, 1992, now abandoned.

BACKGROUND OF THE PRESENT INVENTION

1. Field of the Invention

The present invention relates to the latest managing system of terminal DB for managing terminal DB in the latest condition. An electrical power company, for example, uses the latest map of the same division (update period is about the one to seven days/section) in the plural departments such as planning, installation and maintenance department. Moreover, the division and element of the map to be used are respectively different in each department. In the case of making reference or updating map by scattering map DBs to a plurality of terminals, it is generally required to maintain the terminal map DB in the latest condition and it is also required to effectively maintain the latest condition.

2. Description of the Related Art

In the case of utilizing, after updating a map in a certain terminal, the same map in the other terminal, the latest map data is transferred and maintenance of terminal map DB consisting of setup (update) of map DB are conducted, each time when utilization is required, and thereafter planning has been conducted by utilizing the terminal map.

Maintenance of such terminal map DB has a problem that a longer waiting time is generated until planning can be done at the terminal using the latest map, because the latest map data must be transferred, for use from the host, to a terminal through a line and stored in a terminal map DB and a longer time is also required for line processing and I/O processing. Moreover, there has been a problem that the latest update terminal does not require any maintenance of terminal map DB and does not require any waiting time for utilization, namely the waiting time is fluctuated depending on the terminals. In addition, it has also been a problem that since terminals are arranged for each department, unused maps are generated in a certain terminal and therefore if maintenance is conducted for all terminals, ineffective processing is generated.

SUMMARY OF THE INVENTION

It is an object of the present invention to curtail the waiting time for using maps at a terminal by previously defining, in a distribution defining file, map numbers to be stored in the terminal map DB, and updating the terminal map DB to the latest one through transfer of the latest map data by deleting the undefined map data and informing the defined map numbers and version numbers to the host at the predetermined time or depending on instruction from the host.

The above-mentioned and other objects and features of the present invention will become more apparent from the following description when read in conjunction with the accompanying drawings. However, the drawings and descriptions are merely illustrative in nature and not restrictive.

DESCRIPTION OF THE PREFERRED EMBODIMENTS

Figure 1:
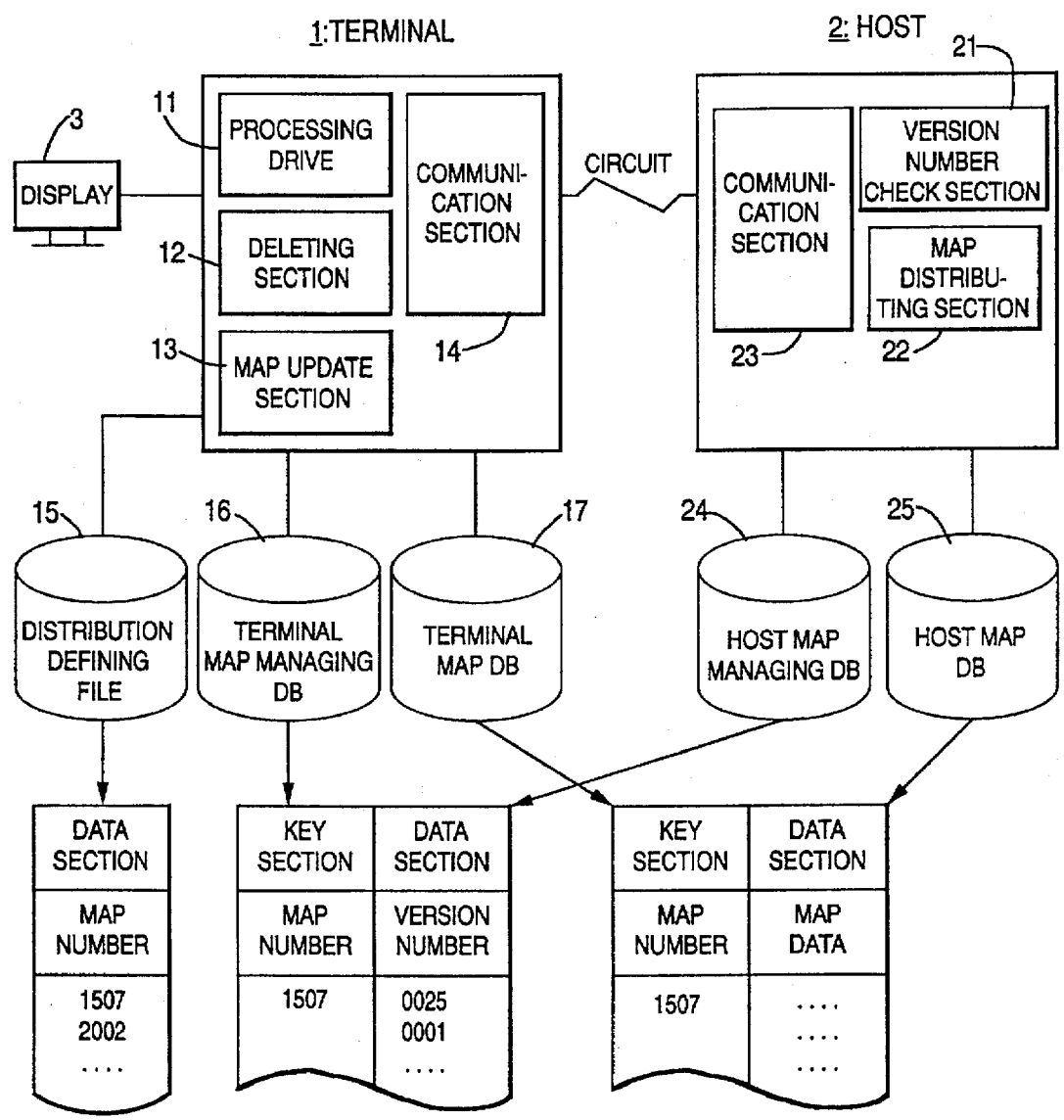
FIG. 1 is a structural diagram of an embodiment of the present invention.

A means for solving the problems will be explained with reference to FIG. 1. In FIG. 1, a terminal 1 updates facilities on the map. A distribution defining file 15 is provided to previously defining the map numbers to be stored in the terminal map DB 17.

A terminal map managing DB 16 is provided to store the version numbers corresponding to map numbers. A terminal map DB 17 is provided to store map data corresponding to map numbers.

A host 2 controllably manages map data.

As shown in FIG. 1, the present invention connects a plurality of terminals 1 to a host 2 through a line, deletes map data, when it is stored in the terminal map DB 17, of the map numbers other than those defined in the distribution defining file 15 at the predetermined time (for example, night time, early morning or lunch break, etc.) or corresponding to an instruction from the host 2, also obtains, by the retrieving, the current version number of the defined map number from the terminal map managing DB 16, informs the map number and this terminal version number to the host 2 through the line and transfers the latest map data and host version number, when the terminal version number is older than the host version number, to the terminal 1 through the line to update the terminal map DB 17 and terminal map managing DB 16 to the latest ones.

Therefore, a map number to be stored in the terminal map DB 17 is previously defined in the distribution defining file 15, a map data not defined is deleted and the defined map number and the current terminal version number are informed to the host 2 at the predetermined time or depending on an instruction from the host in order to update the terminal map DB 17 to the latest one by transfer of the latest map data, thereby curtailing the waiting time at the time of utilizing a map at a terminal 1.

Structure and operation of an embodiment of the present invention will be sequentially explained in detail with reference to FIG. 1 and FIG. 2.

In FIG. 1, a terminal 1 is used for updating facilities on the map comprising elements 11 to 14.

A processing drive 11 drives the processings such as deletion of unwanted map data stored in the terminal map DB 17 of the terminal 1 or update of data to the latest map data at the predetermined time (for example, night time, early morning or lunch break, etc.) or depending on the drive signal from the host 2. (Refer to the processing flowchart of the processing drive 11 of FIG. 2.)

A delete section 12 deletes unwanted map data stored in the terminal map DB 17, namely the map data of map number not defined in the distribution defining file 15.

A map update section 13 updates map data of map number defined in the distribution defining file 15 as the latest map data to the terminal map DB 17. (Refer to the processing flowchart of the map update section 13 of FIG. 2.)

A communication section 14 exchanges data with a communication section 23 of the host 2 through the transmission line.

The distribution defining file 15 previously defines and stores map numbers of map data to be stored (resided) in the terminal map DB 17.

The terminal map managing DB 16 stores and manages version number corresponding to map number of map data to be stored in the terminal map DB 17.

The terminal map DB 17 stores map data corresponding to map number. The host 2 controls and uniquely manages map data sent from a plurality of terminals 1 connected through the line.

A version number check section 21 transfers, when the terminal 1 requests to use a map, the latest map data and host version number, in the case where a terminal version number is older than the host version number, corresponding to the message concerning the map number and terminal version number of the map to be used and updates the map data of the terminal 1 to the latest map data.

Corresponding to the operations that the terminal 1 is driven by the processing drive 11 and the map number defined in the distribution defining file 15 and the terminal version number extracted by retrieving the terminal map managing DB 16 are informed, a map distributing section 22 transfers the latest map data and host version number to the terminal 1 when the terminal version number is older than the host version number and updates the map data of map number defined in the distribution defining file 15 which may be always used by the terminal 1 to the latest map data.

The communication section 23 exchanges data with the communication section 14 of the terminal 1 through the transmission line.

The host map managing DB 24 manages the latest map data by storing the version number corresponding to the map number.

The host map DB 25 manages the map data corresponding to the map number.

A display 3 displays maps for removing and newly installing the facilities.

Next, in accordance with the sequence indicated in the flowchart of FIG. 2, operations for deleting stored map data which have lower probability of use and updating the map data which have higher probability of use to the latest map data when the terminal 1 is idle (for example, night time, early morning, lunch break, etc.) or corresponding to the drive instruction from the host 2 in the structure of FIG. 1 will be explained in detail.

Figure 2:
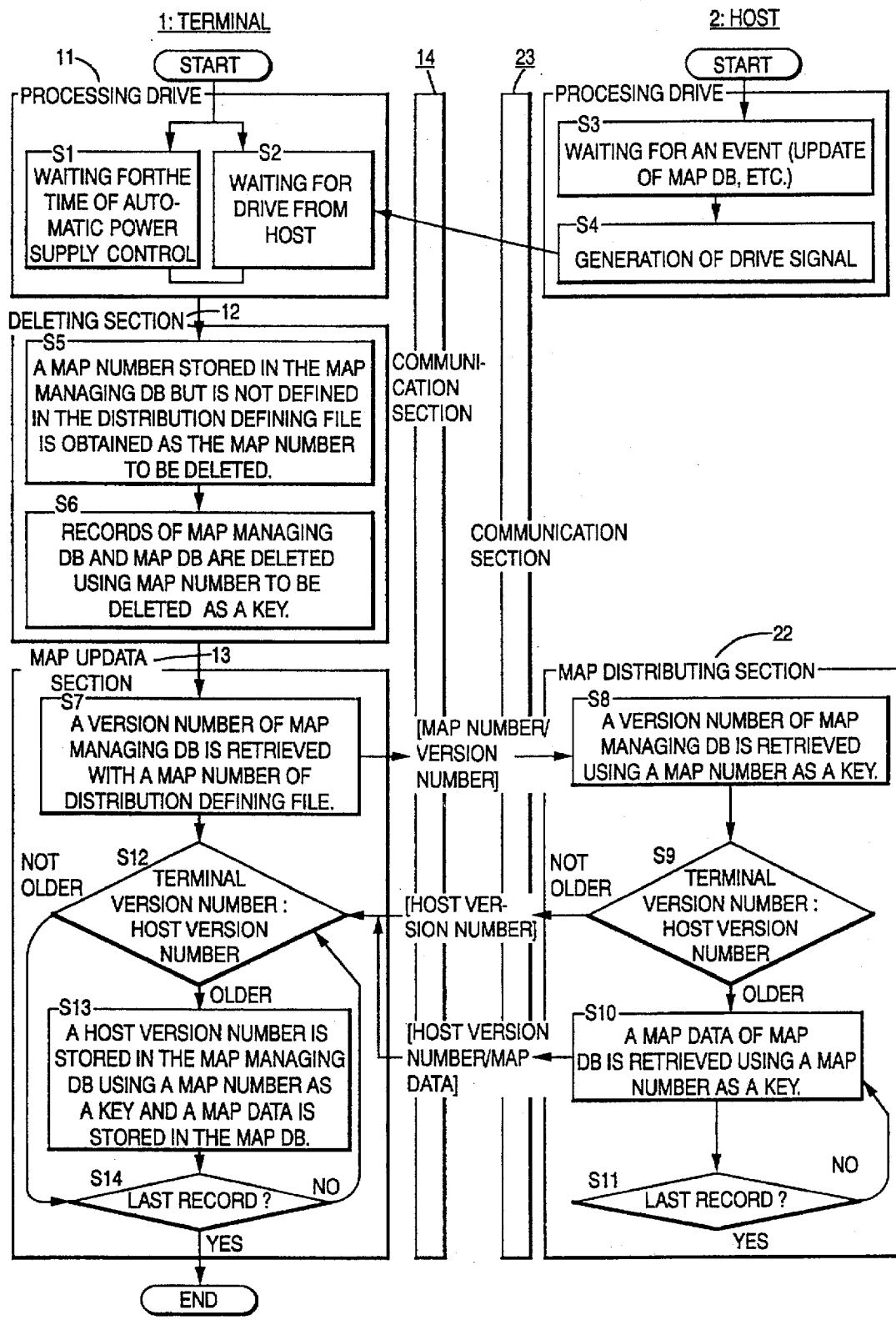
FIG. 2 is a flowchart for explaining operations of the present invention.

In FIG. 2, the processing drive section 11 waits for the time of automatic power supply control in the step S1. In this case, the distribution start time and distribution processing procedures are previously registered for the automatic power supply control in the terminal 1 and the distributing processes of the step S5 and the successive steps are started at the distribution start time after waiting for the distribution start time set for the night time, early morning or lunch bread where the registered terminal 1 is idle.

In the step S2, the drive signal is appearing from the host 2 after the waiting time. Namely, the processing drive of host 2 waits for an event, for example, an event of update of the host map DB. When these events are generated, the drive signal is informed to the processing drive 11 of the terminal 1 after a certain waiting time in the step S4. When the start signal is informed, the processing drive 11 starts the distribution processing after the step S5.

In the step S5, the deleting section 12 is in the terminal map managing DB 16 to obtain the map numbers not defined in the distribution defining file 15 and set such map numbers to the map numbers to be deleted.

In the step S6, records of the terminal map managing DB 16 and terminal map DB 17 are deleted using the deleting map numbers as the keys. Thereby, the map data of map number which is usually unused and not defined in the distribution defining file 15 is deleted, capacity size of terminal map DB 17 is increased and ineffective use of memory source of the terminal 1 can be eliminated.

In the step S7, the map update section 13 retrieves and extract the version number of the terminal map managing DB 16 with a map number of the distribution defining file 15. The map number and terminal version number are informed to the map distributing section 22 of the host 2 through the transmission line.

In the step S8, the map distributing section 22 retrieves and extracts the version number (host version number) of the host map managing DB 24 using a map number as the key.

In the step S9, whether the terminal version number is older than the host version number or not is discriminated. When it is older (map data stored in the terminal 1 is older than the map data stored in the host 2 and is not the latest map data), the map data of the host map DB 25 is retrieved and extracted using the map number as the key in the step S10 and the host version number and map data are informed to the terminal 1 through the transmission line. On the other hand, when it is not older (the map data stored in the terminal 1 is the latest data), the host version number is informed to the terminal 1 through the transmission line.

In the step S12, the host version number informed from the host 2 is compared with the terminal version number. When the terminal version number is not older than the host version number, if the last record is not detected in the step S14, the processings of step S12 and the successive steps are repeated and if the last record is detected, processing is completed. On the other hand, when the terminal version number is older than the host version number, the host version number is stored in the terminal map managing DB 16 using the map number as the key in the step S13, the map data transferred to the terminal map DB 17 from the host 2 is stored therein and is updated to the latest data. When the last record is not detected in the step S14, the processings of step S12 and successive steps are repeated and when the last record is detected, the processing is completed.

With the processings mentioned above, the map numbers to be resided in the distribution defining file 15 are defined previously and stored, the map data of the map numbers other than those defined in the distribution defining file 15 are deleted from the terminal map managing DB 15, terminal map DB 16 at the idle time or corresponding to reception of the drive signal from the host 2, the defined map numbers and the terminal version numbers thereof are informed to the host 2, the latest map data is transferred when the terminal version number is older than the host version number and is not the latest one to update the terminal map managing DB 16 and terminal map DB 17 to the latest version number and map data. When processing is to be done in the terminal 1 using the map data, the time for down-loading the latest map data from the host 2 is no longer required, waiting time can be eliminated and quick processing can be realized by deleting the data which is not required to be resided among the map data stored in the relevant terminal 1 and updating such map data into the latest map data.

As explained above, the present invention employs a structure that a map number to be stored in the terminal map DB 17 is previously defined in the distribution defining file 15, undefined map data is deleted and defined map number and the current terminal version number are informed to the host 2 at the predetermined time or corresponding to the instruction from the host and the latest map data is received from the host 2 to update the terminal map DB 17 and terminal map managing DB 16 to the latest ones. Thereby, the waiting time for utilizing the map at the terminal 1 (the time required for down-loading the latest map data from the host 2 and executing I/O process to such map data) can be eliminated.

While the invention has been illustrated and described in great detail in the drawings and foregoing description, it will be recognized that many changes and modifications will occur to those skilled in the art. It is therefore intended, by the appended claims to cover any such changes and modifications as fall within the true spirit and scope of the invention.

I claim:

1. A latest managing system, including a plurality of terminals connected to a host through a transmission line, the system comprising:

a host map data base storing map data for the plurality of terminals;

a terminal map database DB, storing defined and undefined map data corresponding to terminal map numbers having corresponding terminal version numbers and storing a distribution defining file stored in said terminal map database DB and defining the map data which are to be updated, wherein:

said undefined map data, which is map data not defined in said distribution defining file, is deleted from said terminal data base at the predetermined time or according to instructions from the host;

at least one of said terminal version numbers of the defined terminal map numbers is transmitted to the host through the transmission line; and the latest map data and host version number are transferred, when the terminal version number is older than the host version number and the map data is defined in the distribution defining file, to the terminal to update the terminal map database.

2. A latest managing system of terminal database DB according to claim 1, wherein said predetermined time is set at an idle time where the terminal is not utilized.

3. A latest managing system, including a plurality of terminals connected to a host through a transmission line, the system comprising:

a host map database storing map data for the plurality of terminals;

a terminal map database DB, storing defined and undefined map data corresponding to terminal map numbers having corresponding terminal version numbers;

a distribution defining file, defining map data having corresponding map numbers and map version numbers, which are to be updated; and a map update section, interfacing with the host, deleting undefined map data from said terminal data base at the predetermined time or according to instructions from the host, wherein:

at least one of said terminal version numbers of defined map numbers is transmitted to the host through the transmission line, and the latest map data and host version number are transferred, when the current terminal version number is older than the host version number and the map data is defined in the distribution defining file, to the terminal to update the terminal map database.

4. A latest managing system, including a plurality of terminals connected to a host through a transmission line, the system comprising:

a host map database, storing map data, its map number and its version number for the plurality of terminals;

a distribution defining file, storing map numbers to be stored in said terminals;

a terminal map database, storing map data of which map number is defined or not defined in said distribution defining file, its map number and its version number;

an updating means for deleting map data, of which map number is not defined in said distribution defining file, in said terminal database at the predetermined time or according to instructions from the host; and a transferring means for transferring map data, of which version number in said terminal map data base is older than the version number in said host map database and of which map number is defined in said distribution defining file, from said host map database through the transmission line.

* * * * *